(12) United States Patent
Ossa

(10) Patent No.: US 7,660,329 B2
(45) Date of Patent: Feb. 9, 2010

(54) MANAGING PROTOCOL INFORMATION USED IN EXCHANGING COMMUNICATIONS

(75) Inventor: Juan F. Ossa, Claremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 573 days.

(21) Appl. No.: 11/499,180

(22) Filed: Aug. 3, 2006

(65) Prior Publication Data

US 2008/0032692 A1 Feb. 7, 2008

(51) Int. Cl.
*H04J 3/22* (2006.01)

(52) U.S. Cl. .................. 370/469; 370/395.21; 370/380; 370/379; 370/395.5; 370/338; 709/231; 709/230; 709/245; 379/88.12; 379/88.07; 379/67.1; 707/3; 707/104.1; 707/100; 707/102; 707/10

(58) Field of Classification Search ................. 709/203, 709/227, 206, 223, 231, 230, 245; 270/466, 270/401; 370/395.21, 380, 379, 395.5, 338; 707/3, 104.1, 102, 10
See application file for complete search history.

(56) References Cited

U.S. PATENT DOCUMENTS

2002/0083073 A1* 6/2002 Vaidya et al. .............. 707/102
2003/0204467 A1* 10/2003 Kartha et al. ................. 705/37
2007/0043943 A1* 2/2007 Peretti ........................ 713/167

* cited by examiner

*Primary Examiner*—Pankaj Kumar
*Assistant Examiner*—Yosief Berhane
(74) *Attorney, Agent, or Firm*—Osha • Liang LLP

(57) ABSTRACT

A method and apparatus for managing protocol information used in exchanging communications is provided. One or more protocol profiles are stored. Each of the protocol profiles is associated with a protocol. One or more transaction profiles are stored. Each of the transaction profiles identifies a combination of protocol profiles. One or more trading partner transaction profiles are stored. Each of the trading partner transaction profiles identifies a configuration of protocols for exchanging communications with a receiving party. After storing the profiles, a particular parameter value of a particular protocol profile is updated to identify an updated value without updating any of the transaction profiles. Updating the particular parameter value causes the updated value to be inherited by at least one of the transaction profiles. An application may obtain the updated value by accessing a profile that references the particular protocol profile.

27 Claims, 6 Drawing Sheets

Note: references are depicted in parenthesis and italics.

MANAGING PROTOCOL INFORMATION USED IN EXCHANGING COMMUNICATIONS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Commerce may be characterized according to the parties involved. Some types of commerce may be characterized as B2C (or business-to-consumer) if the commerce is between a business and an individual consumer. On the other hand, commerce that involves two businesses is generally referred to as B2B (or business-to-business).

B2B commerce is typically performed electronically. A single electronic communication, such as a communication concerning B2B commerce, invariably involves many types of protocols, such as a protocol used to describe how the content of a communication should be structured or a protocol used in sending the communication to another party. A first party may send an electronic communication to a second party using an application. When an application sends a communication to another party, the application needs to be informed of how to send the communication. As a result, the computer systems of a business may maintain information on (a) which protocols are needed to communicate with other businesses, and (b) how to implement the protocols necessary to communicate with the other businesses.

According to one approach for doing so, a business may store an electronic record for each party with which they wish to communicate. The record identifies all the protocols that are needed to communicate with that party. Further, the record further identifies how to implement each protocol identified by the record. For example, the record may identify a complete set of parameter values for all of the configurable parameters of each protocol identified by the record.

A problem with this prior approach, which is not addressed by the prior art, is that a large number of records may need to be maintained. For example, some businesses may need to communicate with 10,000 other parties; as a result, 10,000 separate records fully describing how to implement any protocol necessary to communicate with that party would need to be maintained. The cost, both in time and resources, to create these 10,000 records would be high, as each of the 10,000 records would need to be retyped from scratch or individually created from a template.

Moreover, another problem experienced by prior approaches concerns how changes are made to the records. If a change that affects multiple records needs to be made, then the change must be made to each of those records individually, thereby requiring an undesirable amount of time and resources to do so. Further, storing 10,000 distinct records also requires an undesirable amount of storage space.

SUMMARY

Embodiments of the invention provide techniques for managing protocol information used in exchanging communications in a manner that overcomes the inefficiencies and drawbacks of prior approaches. In an embodiment, protocol information is stored a variety of different profiles that are arranged in a hierarchy (a "profile hierarchy"). Profiles that are higher in the profile hierarchy ("higher-level profiles") may inherit properties of profiles that are lower in the hierarchy ("lower-level profiles"). For example, a profile in the lowest level of the hierarchy may describe how to configure a particular protocol by identifying a set of parameters values associated with each configurable parameter of that protocol. A higher-level profile may inherit the parameter values identified in a lower-level profile. A particular higher-level profile may also override one or more parameters values of a lower-level profile that the higher-level profile would otherwise inherit. Any number of higher-level profiles may inherit at least a portion of the parameter values identified in a particular lower-level profile.

According to an embodiment of the invention, a business may define a default configuration for each of a variety of different protocols in a profile at the lowest level of the profile hierarchy (referred to as "a protocol profile"). A higher-level profile (such as a "transaction profile") may identify how to configure a combination of protocol profiles. A transaction profile may identify all the information necessary for a first party ("the sending party") to send a communication to another party ("the receiving party") using a certain combination of protocols. The business may then define a higher-level profile (such as "a trading partner transaction profile") that references a particular transaction profile, and identifies how to configure all protocols required to communicate with an associated receiving party, e.g., a parameter value for a configurable parameter of a protocol will either be inherited or specified therein.

In this way, an automated process, such as a business application, may obtain all the information necessary to send a communication to the receiving party from the higher-level profile associated with the receiving party. Advantageously, embodiments of the invention allow protocol information used in exchanging communications to be managed using less time and resources than by prior approaches.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENT(S)

In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

Functional Overview

Embodiments of the invention provide techniques for managing protocol information used in exchanging communications. Information about protocols used for exchanging communications is stored and maintained in a profile hierarchy. The profiles may be evaluated by an application at runtime to determine the protocol information necessary to send a communication to another party. For purposes of providing a clear explanation, the party that maintains the profile hierarchy shall be referred to as the "sending party," and the plurality of parties with which the sending party communicates shall each be referred to as a "receiving party." While the terms "sending party" and "receiving party" may suggest a one-way communication, this is not necessarily so, as the sending party exchanges (i.e., sends and receives) communications with each of the receiving parties.

Figure 1:
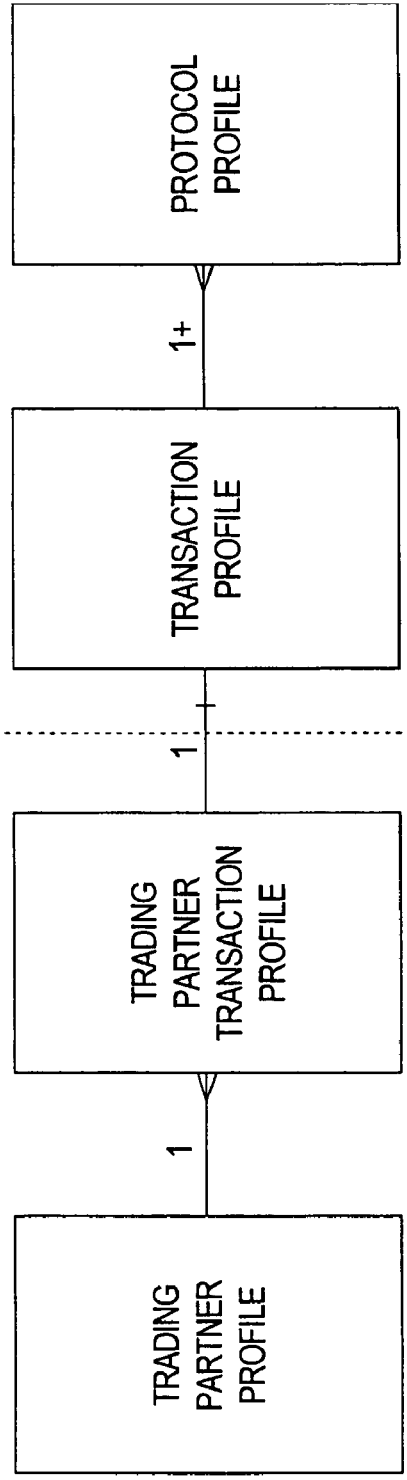
FIG. 1 is a graphical depiction of a profile hierarchy according to an embodiment of the invention.

FIG. 1 is a graphical depiction of a profile hierarchy according to an embodiment of the invention. As shown in FIG. 1, a profile hierarchy may include a protocol profile, a transaction profile, a trading partner transaction profile, and a trading partner profile. Each type of profile is discussed below.

Protocol Profiles

A protocol profile is at the lowest level of the profile hierarchy. A protocol profile defines a default configuration for a particular protocol. For example, a protocol profile may identify, for a particular protocol, a set of parameter values for each configurable parameter of that protocol. The default configuration defined in a particular protocol may be used for every implementation that uses that protocol, although portions of the default configuration may be overridden, as discussed in further detail below.

A protocol profile may define a default configuration for any type of protocol. In an embodiment, the types of protocols for which a protocol profile may store a default configuration include a business protocol, a delivery protocol, and a transport protocol. A business protocol is a protocol that specifies rules for structuring the content or payload of a communication. Non-limiting, illustrative business protocols include the UN/EDIFACT protocol and the ASC X12 protocol.

A delivery protocol is a protocol that specifies rules for how to package the content of a communication. A delivery protocol is agnostic to the payload of a communication, i.e., a delivery protocol is used to create the envelope of a communication, but is not used to describe what the content of the communication should look like. Non-limiting, illustrative delivery protocols include the AS1 protocol, the AS2 protocol, the ebXML protocol, and the RNIF protocol (RosettaNet implementation framework) by RosettaNet. Note that certain delivery protocols could also serve as a business protocol as well, e.g., the RNIF protocol.

A transport protocol is a protocol that specifies rules for how to send a communication. Non-limiting, illustrative transport protocols include the FTP protocol, the HTTP protocol, and the SMTP protocol.

Transaction Profiles

The next profile in the profile hierarchy after a protocol profile is a transaction profile. A transaction profile describes the information required to configure any protocol involved in exchanging a communication with a particular receiving party.

A transaction profile identifies at least one protocol profile. Generally, a transaction profile will identify three protocol profiles, namely a first protocol profile that defines a default configuration for a business protocol, a second protocol profile that defines a default configuration for a delivery protocol, and a third protocol profile that defines a default configuration for a transport protocol. A transaction profile that identifies a protocol profile associated with a business protocol, a delivery protocol, and a transport protocol will inherit the properties of these identified protocol profiles. In this way, a transaction profile may inherit the parameters values of each configurable parameter for each type of protocol used in exchanging a communication with a receiving party.

For example, as shown in FIG. 1, a first protocol profile may identify a default configuration for the UN/EDIFACT protocol, a second protocol profile may identify a default configuration for the AS2 protocol, and a third protocol profile may identify a default configuration for the HTTP protocol. A particular transaction profile may identify the combination of the first protocol profile, the second protocol profile, and the third protocol profile. In this way, the particular transaction profile would inherit all the parameter values for the configurable parameters of the UN/EDIFACT protocol, the AS2 protocol, and the HTTP protocol.

The process of inheriting a profile property, such as a parameter value of a configurable parameter of a protocol, from another profile shall be discussed in further detail below in the section entitled "Inheriting and Overriding Parameter Values."

Trading Partner Transaction Profiles and Trading Partner Profiles

As shown in FIG. 1, the next profile in the profile hierarchy after a transaction profile is a trading partner transaction profile, and the next profile in the profile hierarchy after a trading partner transaction profile is a trading partner profile. A trading partner profile identifies a particular trading relationship with a particular receiving party. For example, the trading partner profile depicted in FIG. 1 corresponds to the trading relationship with a particular receiving company, namely Acme Co. Trading partner profiles may be associated with any receiving party with which a business exchanges communications, e.g., if a company is comprised of several divisions, and the sending party communicates with each division in a different manner, then the trading relationship with each division may be reflected in a different trading partner profile.

Each trading partner profile identifies a trading partner transaction profile. A trading partner transaction profile identifies how to configure all protocols required to communicate with an associated receiving party. For example, a parameter value for each configurable parameter of each protocol involved in communicating with the receiving party associated with the trading partner transaction profile will either be inherited from a transaction profile or specified in the trading partner transaction profile. For example, the trading partner transaction profile depicted in FIG. 1 describes how to communicate with Acme Co. using the UN/EDIFACT protocol, AS2 protocol, and HTTP protocol. Thus, the particular configuration of any of the UN/EDIFACT protocol, AS2 protocol, and HTTP protocol, specified in the trading partner transaction profile, may differ than that specified in the transaction profile referenced by the trading partner transaction profile because the configuration specified by the trading partner transaction profile is specific for a particular receiving party (namely Acme Co.), whereas the configuration specified by the transaction profile is generic (generic in the sense that the configuration may be inherited, in whole or in part, by any number of other trading partner transaction profiles).

In an embodiment not depicted in FIG. 1, the trading partner transaction profile may be part of the trading partner profile.

The exact number and nature of the profiles depicted in FIG. 1 is merely exemplary, as other embodiments may have different types or numbers of profiles than that depicted in FIG. 1. Having discussed an overview of the profiles of a profile hierarchy according to an embodiment of the invention, a description of a system for managing protocol information shall now be discussed.

System Overview

Figure 2:
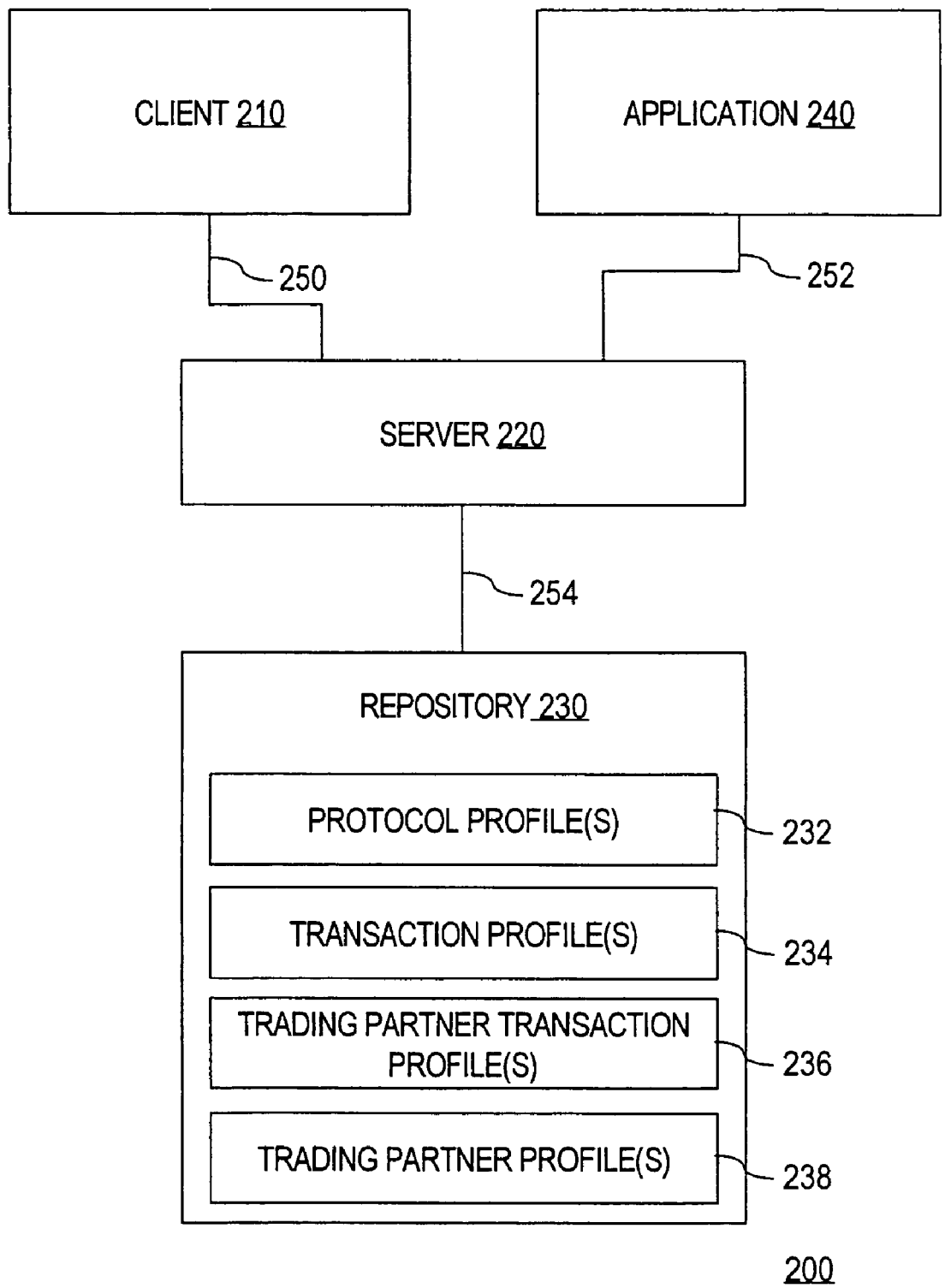
FIG. 2 is a block diagram of an illustrative system according to an embodiment of the invention.

FIG. 2 is a block diagram of an illustrative system 200 for managing protocol information according to an embodiment of the invention. In an embodiment, system 200 includes a client 210, a server 220, a repository 230, an application 240, and communications links 250, 252, and 254.

Client 210 may be implemented by any medium or mechanism that enables a user to communicate with server 220. For example, a user may use client 210 to send a command to server 220 to cause server 220 to store or update data in a profile maintained by repository 230. Non-limiting, illustrative examples of client 210 include a web browser, an application, a personal computer, and a wireless handheld device.

Server 220 may be implemented by any medium or mechanism that provides for communicating with client 210 and repository 230. Server 220 receives requests to perform operations on data stored in repository 230 and performs those operations on the data stored in repository 230. Non-limiting, illustrative examples of server 220 include a database server and a LDAP server.

Repository 230 may be implemented by any medium or mechanism that provides for storing data, such as a profile. Non-limiting, illustrative examples of repository 230 include a database and a LDAP directory.

Repository 230 stores one or more protocol profiles 232, one or more transaction profiles 234, one or more trading partner transaction profiles 236, and one or more trading partner profiles 238.

Application 240 may be implemented by any medium or mechanism that retrieves data from a profile stored by repository 230. Application 240 evaluates the data stored in a profile at runtime, i.e., the data stored in a profile is evaluated by application 240 at the time application 240 processes a request to send a communication to a receiving party. In the embodiment depicted in FIG. 2, application 240 may communicate with server 220 to retrieve a protocol profile, a transaction profile, a trading partner transaction profile, or a trading partner profile. In an embodiment not depicted in FIG. 2, application 240 may communicate directly with repository 230 to retrieve a protocol profile, a transaction profile, a trading partner transaction profile, or a trading partner profile. Non-limiting, illustrative examples of application 240 include a B2B application.

Communications link 250 may be implemented by any medium or mechanism that provides for the exchange of data between client 210 and server 220. Communications link 252 may be implemented by any medium or mechanism that provides for the exchange of data between B2B application 240 and server 220. Communications link 254 may be implemented by any medium or mechanism that provides for the exchange of data between server 220 and repository 230. Examples of communications links 250, 252, and 254 include, without limitation, a network such as a Local Area Network (LAN), Wide Area Network (WAN), Ethernet or the Internet, or one or more terrestrial, satellite or wireless links.

For purposes of providing a clear example, only a single client, a single application, a single server, and a single repository are depicted in FIG. 2. However, it should be understood to those in the art that any number of clients, applications, servers, and/or repositories may be included in system 200. For example, protocol profiles 232, transaction profiles 234, trading partner transaction profiles 236, and trading partner profiles 238 may each be stored in one or more repositories, such as one or more LDAP directories. Consequently, embodiments of the invention are not limited to any number of clients, applications, servers, or repositories.

Managing Protocol Information

Figure 3:
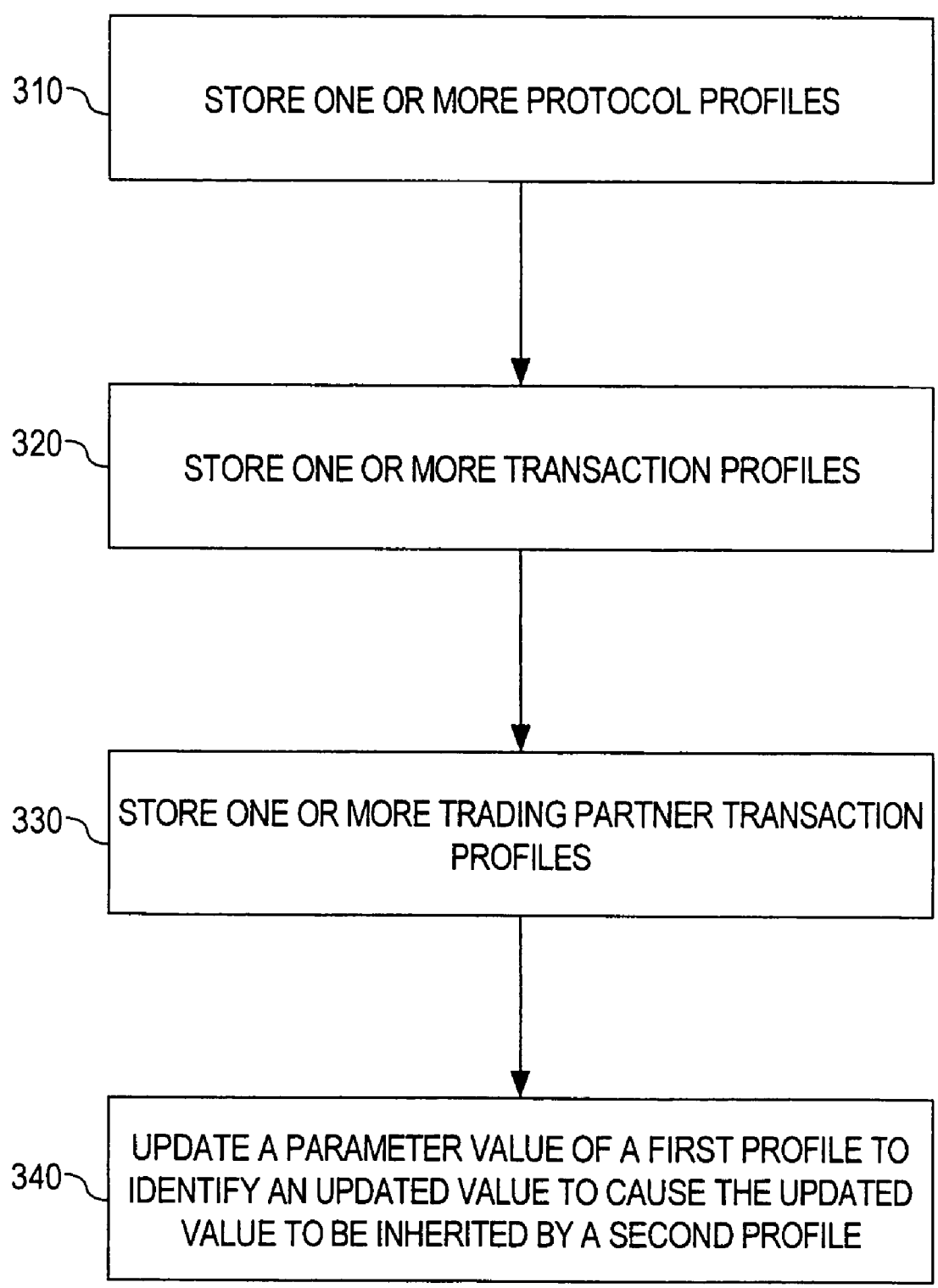
FIG. 3 is a flowchart illustrating the functional steps of managing protocol information used in exchanging communications according to an embodiment of the invention.

FIG. 3 is a flowchart illustrating the functional steps of managing protocol information used in exchanging communications according to an embodiment of the invention. While the steps depicted in FIG. 3 are depicted as occurring in a particular sequence, the sequence depicted in FIG. 3 is merely illustrative. As a result, other embodiments of the invention may perform the steps of FIG. 3 in a different sequence, e.g., steps 310, 320, and 330 may be performed in any order or in parallel. The explanation of the steps of FIG. 3 shall make reference to the block diagram of FIG. 2.

In step 310, one or more protocol profiles 232 are stored in repository 230. A user may use an interface provided by client 210 to define a protocol profile and/or store the protocol profile in repository 230.

In step 320, one or more transaction profiles 234 are stored in repository 230. A user may use an interface provided by client 210 to define a transaction profile and/or store the transaction profile in repository 230.

In step 330, one or more trading partner transaction profiles 236 are stored in repository 230. A user may use an interface provided by client 210 to define a trading partner transaction profile and/or store the trading partner transaction profile in repository 230.

While not depicted in FIG. 3, contemporaneous with the performance of steps 310-330, one or more trading partner profiles 238 may be stored in repository 230. A user may use an interface provided by client 210 to define a trading partner profile and/or store the trading partner profile in repository 230.

In step 340, a parameter value of a first profile is updated to identify an updated value to cause the updated value to be inherited by a second profile. For example, in step 340, a parameter value of a particular protocol profile 232 may be updated to identify an updated value to cause the updated value to be inherited by a particular transaction profile 234 when application 240 evaluates the particular transaction profile. The profile to be updated may be updated by a user using an interface provided by client 210. The process of a higher-level profile inheriting an updated value from a lower-level profile shall be discussed in greater detail in the next section.

Inheriting and Overriding Parameter Values

Figure 4A:
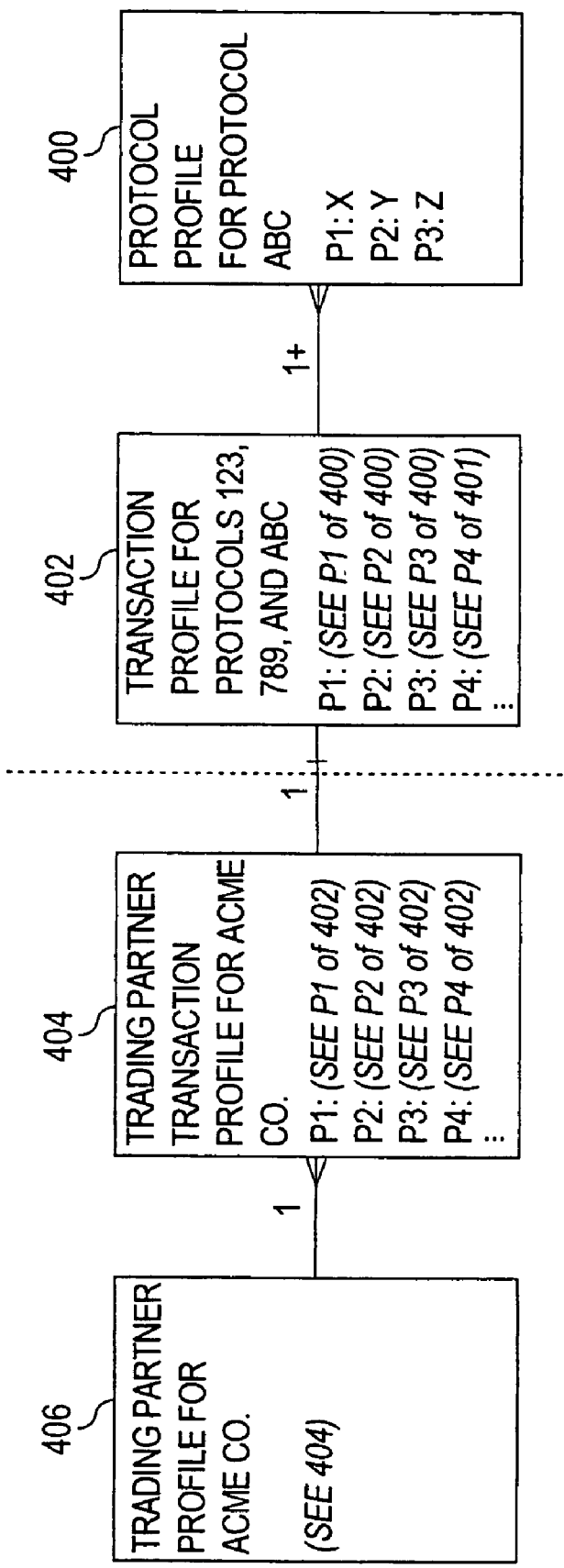
FIG. 4A is a graphical depiction of a profile inheriting a value according to an embodiment of the invention.

When application 240 evaluates information stored in a profile, the information stored therein may cause a parameter value to be inherited from a lower-level profile. The process of a higher-level profile inheriting an updated value from a lower-level profile shall be discussed with reference to FIG. 4A, which is a graphical depiction of a profile, in a profile hierarchy, inheriting a value according to an embodiment of the invention. FIG. 4A depicts a profile hierarchy comprising a protocol profile 400 that defines a default configuration for the ABC protocol, a transaction profile 402 that defines a default configuration for the combination of the 123 protocol, the 789 protocol, and the ABC protocol, a trading partner transaction profile 404 that defines a default configuration for this combination of protocols for the Acme Co., and a trading partner profile 406 that is associated with Acme Co. Naturally, the company names, parameter values, and protocol names depicted in FIG. 4A are merely exemplary, as they could be any value.

The profiles depicted in FIG. 4A may be used to enable a sending party to exchange communications with Acme Co. Consider the example where application 240 needs to send a communication to Acme Co. To do so, application 240 may initially retrieve trading partner profile 406, as it is associated with the desired receiving party, in this case Acme Co. The trading partner profile 406 that is associated with Acme Co. identifies a reference to trading partner transaction profile 404.

A reference from a first profile to a second profile, such as those depicted in parenthesis and italics in FIG. 4A, may be embodied by any mechanism that allows for one profile to reference either another profile or a parameter value identified by another profile. Certain references, such as the reference to trading partner transaction profile 404 in trading partner profile 406, may identify a particular profile. Other references, such as the reference to parameter P1 of transaction profile 402 in trading partner transaction profile 404, may identify a particular parameter value of a particular profile.

Returning to the present example, once application 240 obtains trading partner transaction profile 404, which is associated with the particular sending party to which application 240 wishes to send a communication (i.e., Acme Co.), application 240 is informed of all the information necessary to configure any protocol involved in sending a communication to that receiving party. This is so because trading partner transaction profile 404 identifies, for each configurable parameter of any protocol required to send a communication to Acme Co., how to configure that configurable parameter. A profile may identify a particular parameter value for a configurable parameter of a protocol either by inheriting the parameter value or by specifying an override value for the parameter value.

To illustrate, in FIG. 4A, trading partner transaction profile 404 depicts four illustrative configurable parameters of protocols required to send a communication to Acme Co. Parameters P1-P3 correspond to configurable parameters of the ABC protocol, and as such, are depicted in protocol profile 400. Parameter P4 corresponds to a configurable parameter of the 789 protocol; a protocol profile for the 789 profile is not depicted in FIG. 4A. Note that while only four configurable parameters (P1-P4) are depicted in trading partner transaction profile 404, typical implementations involve many more configurable parameters, and as such any number of configurable parameter values may be identified in a profile.

Trading partner transaction profile 404 identifies a parameter value for each of parameters P1-P4 by containing a reference to a location where the corresponding parameter value may be found. For parameter P1, trading partner transaction profile contains a reference to transaction profile 402, which in turn contains a reference to protocol profile 400. Thus, when application 240 retrieves the parameter value for parameter P1 from trading partner transaction profile 404, the parameter value of P1 identified by trading partner transaction profile 404 will be X. Similarly, when application 240 retrieves the parameter value for parameters P2 and P3 from trading partner transaction profile 404, the parameter values of P2 and P3 identified by trading partner transaction profile 404 will be Y and Z respectively.

For parameter P4, trading partner transaction profile contains a reference to transaction profile 402, which identifies the value of P4 as being "ENCRYPTED." Thus, the parameter value of P4 identified by trading partner transaction profile 404 is "ENCRYPTED" in FIG. 4A. Note that transaction profile 402 does not reference any other profile for the parameter value of parameter P4. The parameter value "ENCRYPTED" in transaction profile 402 is referred to as an override value since the parameter value does not refer to any other profile, and therefore, effectively prevents the parameter value from being inherited from another profile. Override values are discussed in greater detail below.

Advantageously, inheriting parameter values in this manner reduces both the amount of time and resources required to define how to send electronic communications to receiving parties and the amount of storage space required to describe how to exchange communication with various trading partners when compared to prior approaches.

Instead of inheriting a parameter value from a lower-level profile, a profile may define an override value that overrides the parameter value that the profile would have otherwise inherited. In this way, a configurable parameter value identified by any profile may deviate from a default value that is inherited from a lower-level profile. Additionally, override values may be defined in any number of locations. For example, an override value may be identified in trading partner transaction profile 404 to override a parameter value that would otherwise be inherited from the default configured identified by transaction profile 402.

Figure 4B:
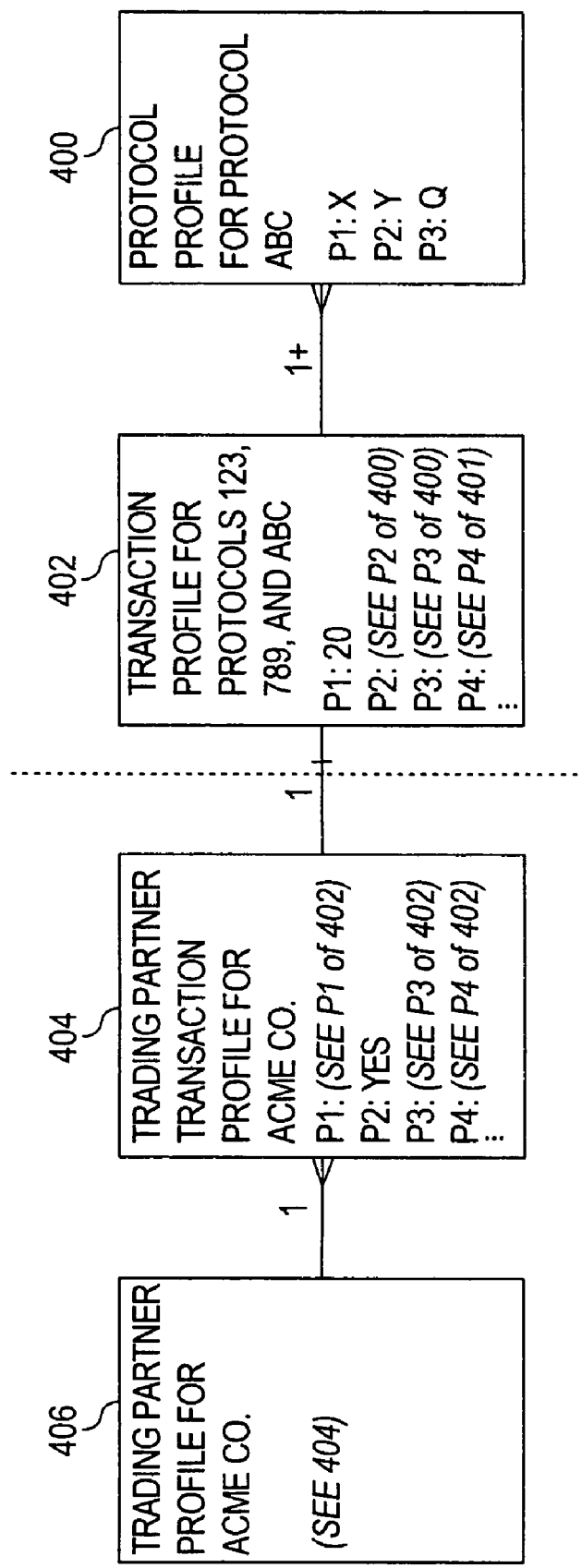
FIG. 4B is a graphical depiction of a profile overriding a value according to an embodiment of the invention.

FIG. 4B is a graphical depiction of a profile, in a hierarchy of profiles, overriding a value according to an embodiment of the invention. The profiles depicted in FIG. 4B correspond to those of FIG. 4A, except that certain parameter values, as discussed below, have been changed in the profiles of FIG. 4B. To illustrate, transaction profile 402 of FIG. 4B defines an override value for parameter P1. Thus, the parameter value inherited by trading partner transaction profile 404 for parameter P1 is 20, rather than X. Trading partner transaction profile 404 also contains an override value for parameter P2. Thus, the parameter value identified by trading partner transaction profile 404 for parameter P2 is YES, rather than Y.

Also, the value of parameter value P3 has been changed from Z to Q in protocol profile 400 relative to FIG. 4A. As a result, the parameter value inherited by trading partner transaction profile 404 for parameter P3 is Q, rather than Z, in FIG. 4B. Changing the parameter value of P3 in protocol profile 400 causes the updated value to be inherited by any higher-level profile that identifies, either directly or indirectly, protocol profile 400 unless the higher-level profile contains an override value for parameter P3. For example, if 5,000 other transaction profiles identified protocol profile 400 without containing an override value for parameter P3, then changing the parameter value of P3 from Z to Q would cause each of those 5,000 transaction profiles to inherit the value of Q for parameter P3.

Advantageously, if a change is required to be made to a default configuration of a particular protocol, the change to the configuration of the protocol is automatically reflected in how communications will be send to each receiving party to uses that protocol in receiving communications. As a result, the time and resources required to manage trading partner relationships is reduced when compared to prior approaches for doing so. The hierarchy of profiles discussed above allows a user to define information about the protocols involved in communicating with a variety of trading partners. Further, a user may make adjustments that all trading partners by changing the default configuration of a protocol, rather than making an adjustment to each and every record that describes how to communicate with a particular trading partner.

Implementing Mechanisms

Figure 5:
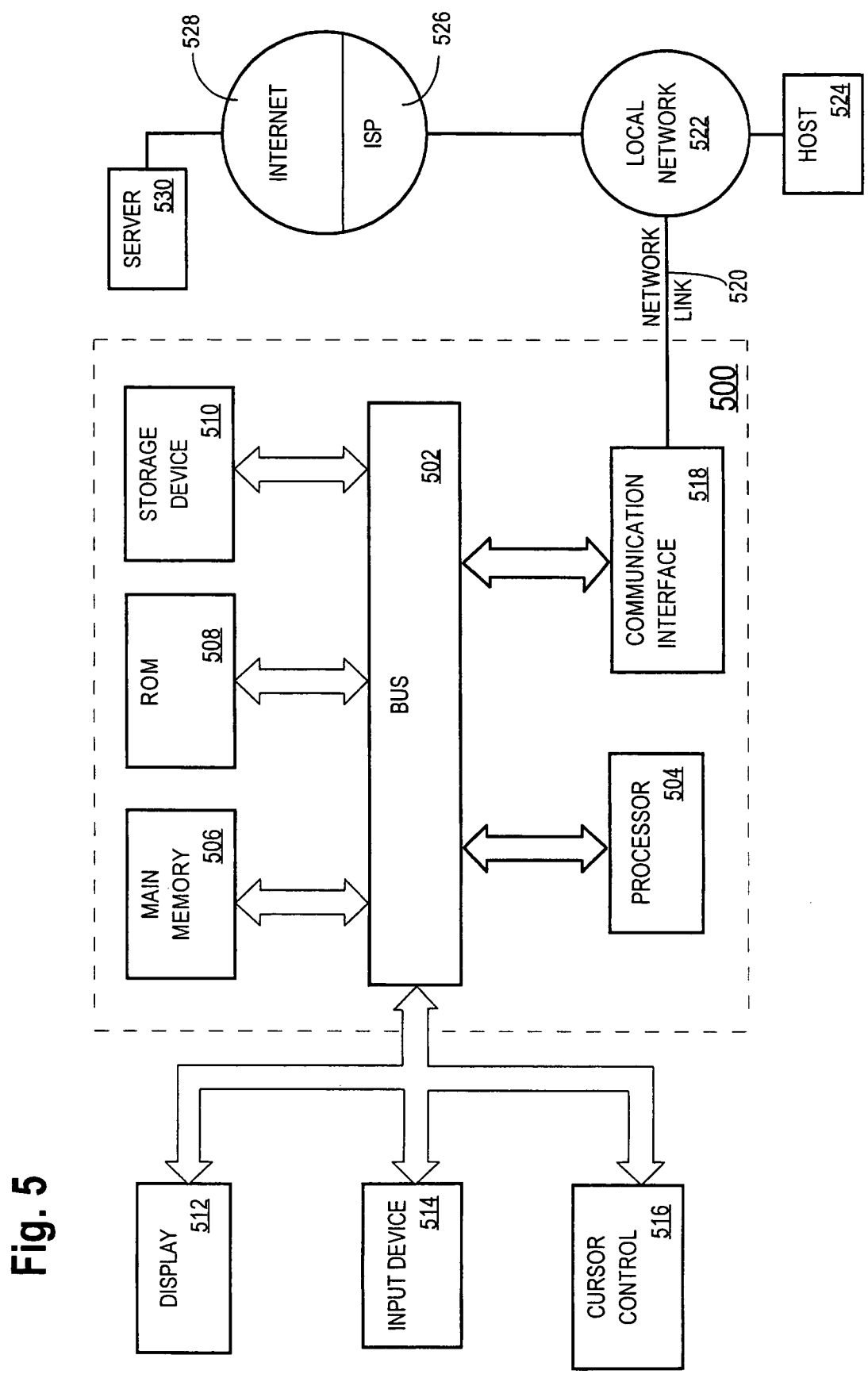
FIG. 5 is a block diagram that illustrates a computer system upon which an embodiment of the invention may be implemented.

Each of client 210, B2B application 240, server 220, and repository 230 may each be implemented on a computer system. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, punchcards, papertape, another other physical medium with patterns of holes, a RAM, a PROM, and EPROM, a FLASH-EPROM, any other memory chip or cartridge, or any other physical medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing protocol information used in exchanging communications, comprising:

storing one or more protocol profiles, wherein each of said one or more protocol profiles is associated with one protocol of a set of protocols, wherein each of said one or more protocol profiles identifies a parameter value for each of a set of parameters for the protocol associated with the protocol profile, and wherein the set of protocols includes one or more business protocols, one or more delivery protocols, and one or more transport protocols;

storing one or more transaction profiles, wherein each of said one or more transaction profiles identifies a set of protocol profiles, wherein the set of protocol profiles is a subset obtained from the one or more stored protocol profiles, and wherein said set of protocol profiles includes at least one selected from a group consisting of a profile associated with a business protocol, a profile associated with a delivery protocol, and a profile associated with a transport protocol;

storing one or more trading partner transaction profiles, wherein each of said one or more trading partner transaction profiles identifies a transaction profile of said one or more transaction profiles; and after (a) storing said one or more protocol profiles, (b) storing said one or more transaction profiles, and (c) storing said one or more trading partner transaction profiles, updating a particular parameter value of a particular protocol profile, of said one or more protocol profiles, to identify an updated value, wherein a profile hierarchy comprises a first level of protocol profiles selected from the one or more stored protocol profiles, a second level of transaction profiles selected from the one or more stored transaction profiles, and a third level of trading partner profiles selected from the one or more stored trading partner transaction profiles, wherein updating the particular parameter value of the particular protocol profile is performed without updating any of said one or more transaction profiles, wherein updating said particular parameter value of the particular protocol profile causes said updated value to be inherited by at least one transaction profile when the particular protocol profile is associated with the first level of the profile hierarchy and when the at least one transaction profile is associated with the second level of the profile hierarchy.

2. The method of claim 1, wherein at least two particular transaction profiles, of said one or more transaction profiles, identify said particular protocol profile, and wherein updating said particular parameter value causes said at least two particular transaction profiles to inherit said updated value.

3. The method of claim 1, further comprising:

storing one or more trading partner profiles, wherein each of said one or more trading partner profiles identifies a trading partner transaction profile of said one or more trading partner transaction profiles, and wherein the profile hierarchy further comprises a fourth level of trading partner profiles selected from the one or more trading partner profiles.

4. The method of claim 1, further comprising:

in response to receiving a request for a set of parameter values for each of one or more protocols used in communication with another entity, performing the steps of:

determining a particular transaction profile, of said one or more transaction profiles, associated with said request;

determining the protocol profiles in the combination of protocol profiles identified by said particular transaction profile;

determining whether any parameter values identified by said particular transaction profile are overridden by said particular transaction profile; and determining, for each of the protocol profiles in the combination of protocol profiles identified by said particular transaction profile, the parameter values identified by each protocol profile which are not overridden by said particular transaction profile.

5. The method of claim 1, wherein said one or more protocol profiles, said one or more transaction profiles, and said one or more trading partner transaction profiles are stored in one or more LDAP directories.

6. The method of claim 1, wherein a particular transaction profile, of said one or more transaction profiles, includes, for a first parameter of said particular transaction profile, a reference to said particular parameter value identified by said particular protocol profile.

7. The method of claim 6, wherein a particular trading partner profile, of said one or more trading partner profiles, includes, for a second parameter of said particular trading partner profile, a reference to a parameter value associated with said first parameter of said particular transaction profile.

8. The method of claim 1, further comprising:

at a particular transaction profile of said one or more transaction profiles, associating an override value with a first parameter that references said particular parameter value, wherein associating said override value with said first parameter ceases to maintain a reference from said first parameter to said particular parameter value.

9. The method of claim 1, wherein a particular transaction profile, of said one or more transaction profiles, maintains a reference from a first parameter to said particular parameter value, and wherein the method further comprises:

at a particular trading partner transaction profile of said one or more trading partner transaction profiles, associating an override value with a second parameter, wherein associating said override value with said second parameter ceases to maintain a reference from said second parameter to a parameter value associated with said first parameter.

10. A machine-readable medium carrying instructions which, when executed by one or more processors, cause protocol information used in exchanging communications to be managed by performing:

storing one or more protocol profiles, wherein each of said one or more protocol profiles is associated with one protocol of a set of protocols, wherein each of said one or more protocol profiles identifies a parameter value for each of a set of parameters for the protocol associated with the protocol profile, and wherein the set of protocols includes one or more business protocols, one or more delivery protocols, and one or more transport protocols;

storing one or more transaction profiles, wherein each of said one or more transaction profiles identifies a set of protocol profiles, wherein the set of protocol profiles is a subset obtained from the one or more stored protocol profiles, and wherein said set of protocol profiles includes at least one selected from a group consisting of a profile associated with a business protocol, a profile associated with a delivery protocol, and a profile associated with a transport protocol;

storing one or more trading partner transaction profiles, wherein each of said one or more trading partner transaction profiles identifies a transaction profile of said one or more transaction profiles; and after (a) storing said one or more protocol profiles, (b) storing said one or more transaction profiles, and (c) storing said one or more trading partner transaction profiles, updating a particular parameter value of a particular protocol profile, of said one or more protocol profiles, to identify an updated value, wherein a profile hierarchy comprises a first level of protocol profiles selected from the one or more stored protocol profiles, a second level of transaction profiles selected from the one or more stored transaction profiles, and a third level of trading partner profiles selected from the one or more stored trading partner transaction profiles, wherein updating the particular parameter value of the particular protocol profile is performed without updating any of said one or more transaction profiles, wherein updating said particular parameter value of the particular protocol profile causes said updated value to be inherited by at least one transaction profile when the particular protocol profile is associated with the first level of the profile hierarchy and when the at least one transaction profile is associated with the second level of the profile hierarchy.

11. The machine-readable medium of claim 10, wherein at least two particular transaction profiles, of said one or more transaction profiles, identify said particular protocol profile, and wherein updating said particular parameter value causes said at least two particular transaction profiles to inherit said updated value.

12. The machine-readable medium of claim 10, wherein the instructions, when executed, further perform:

storing one or more trading partner profiles, wherein each of said one or more trading partner profiles identifies a trading partner transaction profile of said one or more trading partner transaction profiles, and wherein the profile hierarchy further comprises a fourth level of trading partner profiles selected from the one or more trading partner profiles.

13. The machine-readable medium of claim 10, wherein the instructions, when executed, further perform:

in response to receiving a request for a set of parameter values for each of one or more protocols used in communication with another entity, performing the steps of:

determining a particular transaction profile, of said one or more transaction profiles, associated with said request;

determining the protocol profiles in the combination of protocol profiles identified by said particular transaction profile;

determining whether any parameter values identified by said particular transaction profile are overridden by said particular transaction profile; and determining, for each of the protocol profiles in the combination of protocol profiles identified by said particular transaction profile, the parameter values identified by each protocol profile which are not overridden by said particular transaction profile.

14. The machine-readable medium of claim 10, wherein said one or more protocol profiles, said one or more transaction profiles, and said one or more trading partner transaction profiles are stored in one or more LDAP directories.

15. The machine-readable medium of claim 10, wherein a particular transaction profile, of said one or more transaction profiles, includes, for a first parameter of said particular transaction profile, a reference to said particular parameter value identified by said particular protocol profile.

16. The machine-readable medium of claim 15, wherein a particular trading partner profile, of said one or more trading partner profiles, includes, for a second parameter of said particular trading partner profile, a reference to a parameter value associated with said first parameter of said particular transaction profile.

17. The machine-readable medium of claim 10, wherein the instructions, when executed, further perform:

at a particular transaction profile of said one or more transaction profiles, associating an override value with a first parameter that references said particular parameter value, wherein associating said override value with said first parameter ceases to maintain a reference from said first parameter to said particular parameter value.

18. The machine-readable medium of claim 10, wherein a particular transaction profile, of said one or more transaction profiles, maintains a reference from a first parameter to said particular parameter value, and wherein the instructions, when executed, further perform:

at a particular trading partner transaction profile of said one or more trading partner transaction profiles, associating an override value with a second parameter, wherein associating said override value with said second parameter ceases to maintain a reference from said second parameter to a parameter value associated with said first parameter.

19. An apparatus for managing protocol information used in exchanging communications, comprising:

one or more processors; and a machine-readable medium carrying instructions, wherein execution of said instructions by said one or more processors causes:

storing one or more protocol profiles, wherein each of said one or more protocol profiles is associated with one protocol of a set of protocols, wherein each of said one or more protocol profiles identifies a parameter value for each of a set of parameters for the protocol associated with the protocol profile, and wherein the set of protocols includes one or more business protocols, one or more delivery protocols, and one or more transport protocols;

storing one or more transaction profiles, wherein each of said one or more transaction profiles identifies a set of protocol profiles, wherein the set of protocol profiles is a subset taken from the one or more stored protocol profiles, and wherein said set of protocol profiles includes one or more of a profile associated with a business protocol, a profile associated with a delivery protocol, and a profile associated with a transport protocol;

storing one or more trading partner transaction profiles, wherein each of said one or more trading partner transaction profiles identifies a transaction profile of said one or more transaction profiles; and after (a) storing said one or more protocol profiles, (b) storing said one or more transaction profiles, and (c)

storing said one or more trading partner transaction profiles, updating a particular parameter value of a particular protocol profile, of said one or more protocol profiles, to identify an updated value, wherein a profile hierarchy comprises a first level of protocol profiles selected from the one or more stored protocol profiles, a second level of transaction profiles selected from the one or more stored transaction profiles, and a third level of trading partner profiles selected from the one or more stored trading partner transaction profiles, wherein updating the particular parameter value is performed without updating any of said one or more transaction profiles, wherein updating said particular parameter value causes said updated value to be by inherited by at least one of said one or more transaction profiles when the particular protocol profile is associated with the first level of the profile hierarchy and when the at least one transaction profile is associated with the second level of the profile hierarchy.

20. The apparatus of claim 19, wherein at least two particular transaction profiles, of said one or more transaction profiles, identify said particular protocol profile, and wherein updating said particular parameter value causes said at least two particular transaction profiles to inherit said updated value.

21. The apparatus of claim 19, wherein execution of said instructions by said one or more processors further causes:

storing one or more trading partner profiles, wherein each of said one or more trading partner profiles identifies a trading partner transaction profile of said one or more trading partner transaction profiles, and wherein the profile hierarchy further comprises a fourth level of trading partner profiles selected from the one or more trading partner profiles.

22. The apparatus of claim 19, wherein execution of said instructions by said one or more processors further causes:

in response to receiving a request for a set of parameter values for each of one or more protocols used in communication with another entity, performing the steps of:

determining a particular transaction profile, of said one or more transaction profiles, associated with said request;

determining the protocol profiles in the combination of protocol profiles identified by said particular transaction profile;

determining whether any parameter values identified by said particular transaction profile are overridden by said particular transaction profile; and determining, for each of the protocol profiles in the combination of protocol profiles identified by said particular transaction profile, the parameter values identified by each protocol profile which are not overridden by said particular transaction profile.

23. The apparatus of claim 19, wherein said one or more protocol profiles, said one or more transaction profiles, and said one or more trading partner transaction profiles are stored in one or more LDAP directories.

24. The apparatus of claim 19, wherein a particular transaction profile, of said one or more transaction profiles, includes, for a first parameter of said particular transaction profile, a reference to said particular parameter value identified by said particular protocol profile.

25. The apparatus of claim 24, wherein a particular trading partner profile, of said one or more trading partner profiles, includes, for a second parameter of said particular trading partner profile, a reference to a parameter value associated with said first parameter of said particular transaction profile.

26. The apparatus of claim 19, wherein execution of said instructions by said one or more processors further causes:

at a particular transaction profile of said one or more transaction profiles, associating an override value with a first parameter that references said particular parameter value, wherein associating said override value with said first parameter ceases to maintain a reference from said first parameter to said particular parameter value.

27. The apparatus of claim 19, wherein a particular transaction profile, of said one or more transaction profiles, maintains a reference from a first parameter to said particular parameter value, and wherein execution of said instructions by said one or more processors further causes:

at a particular trading partner transaction profile of said one or more trading partner transaction profiles, associating an override value with a second parameter, wherein associating said override value with said second parameter ceases to maintain a reference from said second parameter to a parameter value associated with said first parameter.

* * * * *